United States Patent
Gose et al.

(10) Patent No.: US 10,900,433 B2
(45) Date of Patent: Jan. 26, 2021

(54) OXYGEN SENSOR SYSTEM AND METHOD

(71) Applicant: DELPHI TECHNOLOGIES IP LIMITED, St. Michael (BB)

(72) Inventors: Mark W. Gose, Kokomo, IN (US); Jerry W. Campbell, Carmel, IN (US)

(73) Assignee: DELPHI TECHNOLOGIES IP LIMITED

( * ) Notice: Subject to any disclaimer, the term of this patent is extended or adjusted under 35 U.S.C. 154(b) by 0 days.

(21) Appl. No.: 16/417,719

(22) Filed: May 21, 2019

(65) Prior Publication Data

US 2020/0370495 A1    Nov. 26, 2020

(51) Int. Cl.
*F02D 41/14* (2006.01)
*G05D 23/24* (2006.01)

(52) U.S. Cl.
CPC ..... *F02D 41/1494* (2013.01); *F02D 41/1454* (2013.01); *F02D 41/1481* (2013.01); *G05D 23/2401* (2013.01)

(58) Field of Classification Search
CPC .. F02D 41/14; F02D 41/1494; F02D 41/1454; F02D 41/1481; G05D 23/2401
See application file for complete search history.

(56) References Cited

U.S. PATENT DOCUMENTS

| | | | |
|---|---|---|---|
| 5,719,778 A | 2/1998 | Suzumura et al. | |
| 6,781,098 B2 | 8/2004 | Toyoda | |
| 7,467,628 B2 | 12/2008 | Adams et al. | |
| 9,575,030 B2 * | 2/2017 | Adams | G01N 27/41 |
| 2002/0179443 A1 | 12/2002 | Hada et al. | |
| 2003/0052016 A1 * | 3/2003 | Lin | G01N 27/4067 205/785 |
| 2004/0149008 A1 | 8/2004 | Allmendinger | |
| 2006/0027012 A1 | 2/2006 | Allmendinger | |
| 2007/0222454 A1 | 9/2007 | Reitmeier | |

* cited by examiner

*Primary Examiner* — Hieu T Vo
(74) *Attorney, Agent, or Firm* — Joshua M. Haines

(57) ABSTRACT

An oxygen sensor system includes an oxygen sensor and associated circuitry connected thereto. The oxygen sensor including a reference cell. The associated circuitry measures the impedance of the reference cell at time intervals, wherein the time intervals include a random component.

20 Claims, 4 Drawing Sheets

OXYGEN SENSOR SYSTEM AND METHOD

TECHNICAL FIELD

This relates to oxygen (O2) sensors, and typically such sensors used in vehicle systems to determine oxygen levels in e.g. exhausts. It relates to a method of determining the temperature of such sensors. Such sensors are often referred to as lambda sensors.

BACKGROUND OF THE INVENTION

Typically, an O2 sensor is mounted in the exhaust manifold to monitor how much unburned oxygen is in the exhaust as the exhaust gases exit the engine. Monitoring oxygen levels in the exhaust is a way of gauging the fuel mixture.

A lambda sensor is based on a solid-state electrochemical fuel cell. Its two electrodes provide an output voltage corresponding to the quantity of oxygen in the exhaust relative to that in the atmosphere.

The measurement or reference cell is arranged in contact with the outside air externally and on the other side to the measurement chamber. Opposite to the measurement cell is a pump cell, adapted to pump oxygen into or out of the measurement chamber by means of an electric current. A small amount of exhaust gas can flow into the measurement chamber via a small channel. A change of oxygen concentration in the measurement chamber, consequently changes the measurement or reference cell voltage from its reference value of e.g. 450 mV. To return the measurement cell reference voltage back to 450 mV, current is sent through the pump cell. Depending on the direction and amount of current, oxygen ions can be pumped into or out of the measurement chamber to return the measurement cell voltage to 450 mV.

Typically, cell impedance measurements are performed on an O2 Sensor in order to estimate its temperature. This temperature is subtracted from a desired temperature to provide an error value. This error term can be used as an input to a control loop that varies the PWM duty cycle of battery voltage applied across an e.g. ceramic heating element embedded in the sensor. This control loop seeks to maintain the temperature error at a low value.

To provide feedback to the control loop, cell impedance measurements are performed by an O2 sensor interface circuitry such as an interface IC, connected between the sensor and microprocessor, on a periodic basis as commanded by the microprocessor. The periodicity of these measurement commands is typically precisely controlled by a loop time in the microprocessor software. These measurements are typically made at a rate that is 100 to 800 times faster than the thermal time constant of the ceramic heater/O2 sensor cell combination.

Due to the nature of the impedance measurement, noise injected or arising onto the harness can cause perturbation in the impedance measurement result. When the frequency of the injected noise is an integer multiple of the frequency derived from the periodic impedance measurement, a consistent offset in the actual sensor temperature verses the desired temperature can develop. This temperature error can degrade the accuracy of the A/F ratio measurement and/or reduce the long term reliability of the sensor.

It is an object of the invention to provide an improved system.

SUMMARY OF THE INVENTION

In one aspect is provided an oxygen sensor system including an oxygen sensor and associated circuitry connected thereto, said an oxygen sensor including a reference cell, said associated circuitry configured to measure the impedance of said reference cell at time intervals, wherein said intervals include a random component.

Said associated circuitry may include connection means to said reference cell, and is configured to determine the temperature of said sensor based on the measurement of impedance of said reference cell at said intervals, and control a sensor heater dependent on said determined temperature.

Said associated circuitry may comprise means configured to receive a signal dependent on the voltage of said reference cell, process said signal and determine a PWM signal therefrom, and output said PWM signal to control said heater.

Said associated circuitry may comprise processor means, and intermediate circuitry connected between said oxygen sensor and said processor means.

Said intermediate circuitry may include connection means from said reference cell, and is configured to output a voltage to said processor means based on the impedance of said reference cell.

Said processor means may be configured to send temperature/impedance measurement commands to said intermediate circuitry, and said intermediate means is configured to send a signal to said processor means consequent to receiving said measurement command from said processor means.

The system may include random time delay generating means configure to determine a random time delay, and where said intermediate circuitry is configured to output a voltage signal to said processor means, said voltage signal being indicative of the reference cell impedance at a time point, said time point being the time point of reception of the measurement command plus said random delay time.

Said intermediate circuitry may include said random time delay generating means, and further includes switch means configured to control the output voltage indicative of the impedance of said reference cell to said processor means, dependent on the random time delay.

Said intermediate circuitry is embodied on a chip.

In a further aspect is provided a method of controlling the temperature of an oxygen sensor, said oxygen sensor including a reference cell and a heater, comprising a) measuring the impedance of said reference cell at time intervals; b) determining the temperature of said sensor based on the measurement of impedance of said reference cell at said intervals; c) controlling said heater dependent on said determined temperature; wherein said intervals include a random component.

Said oxygen sensor may be part of an oxygen sensor system which includes processor means, and intermediate circuitry connected between said oxygen sensor and said processor means, said intermediate circuit configured to provide a signal indicative of said impedance to said microprocessor.

Step a) may comprise i) sending out temperature measurement commands at regular intervals to said intermediate circuitry from said processing means; ii) sending impedance measurements of said reference cell consequent to said temperature measurement commands to said processor from said intermediate circuitry; said impedance measurements being taken at a random delay time after corresponding temperature measurement commands.

BRIEF DESCRIPTION OF THE DRAWINGS

The present invention is now described by way of example with reference to the accompanying drawings in which.

DESCRIPTION OF THE PREFERRED EMBODIMENTS

Figure 1:
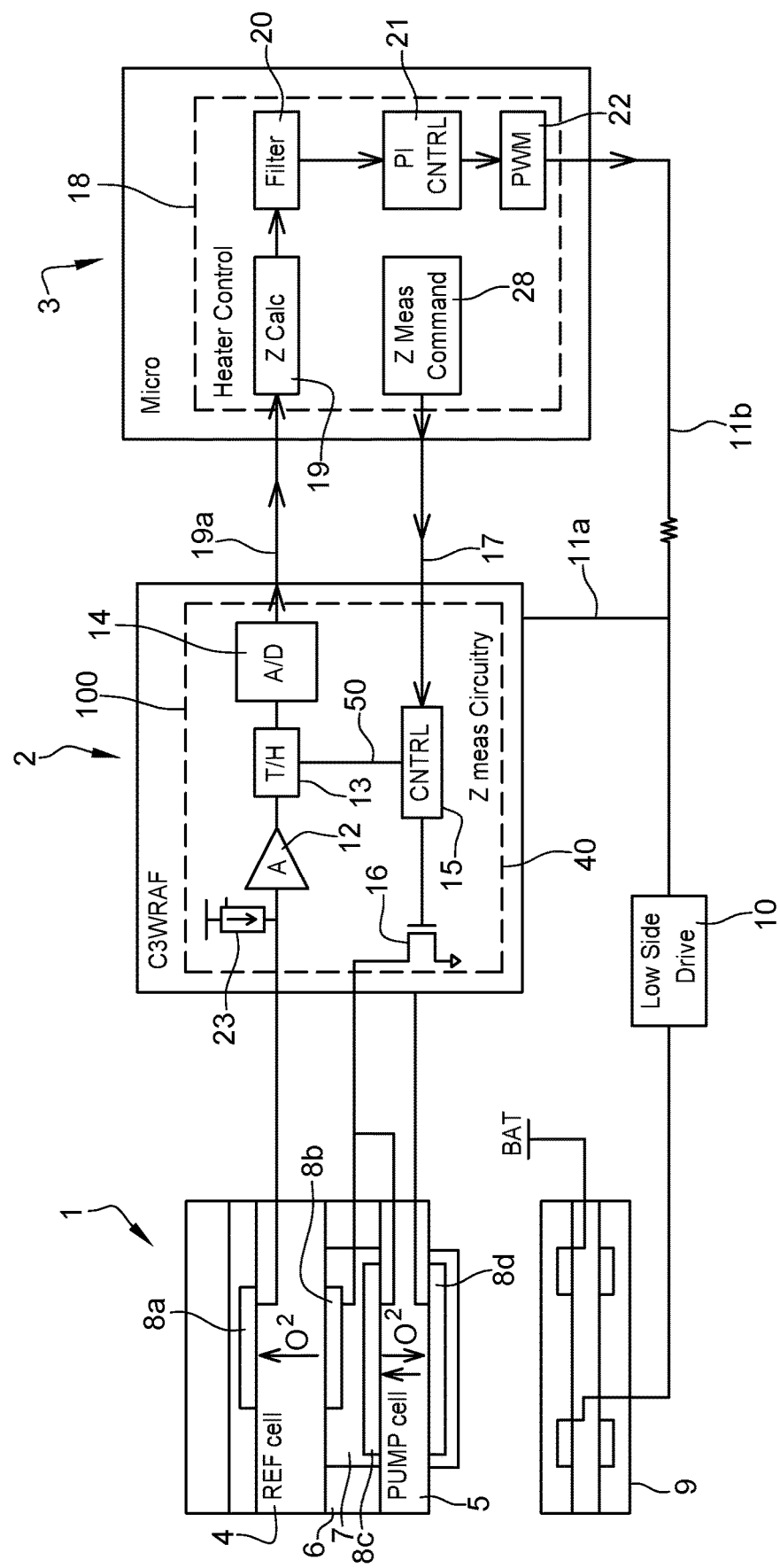
FIG. 1 shows a schematic view of a known O2 sensor system.

FIG. 1 shows a schematic view of a known O2 sensor system. FIG. 1 shows the 2-cell O2 sensor 1, sensor interface IC or circuitry 2 and the microprocessor 3 of the system and their sub-blocks associated with impedance measurements.

On the left hand side is shown the sensor itself which is a 2-cell sensor known in the art. The sensor (element) includes a reference (REF) or measurement cell 4 and a pump cell 5. The two cells are separated on sides by a porous diffusion component 6 (which provides/defines a porous diffusion passage) so as to form a gas detecting cavity 7. Electrodes 8 a, b, c, d are located on either side of the cells and provide appropriate input and outputs to the other parts (circuitry) of the system as shown.

Adjacent to the O2 sensor is a heater 9 such as a ceramic heater. This is connected by one line to a battery (vehicle battery). The other heater terminal is connected to low side drive 10. The electrodes of the two cells are connected to the interface IC 2. The interface IC 2 has input and output connections to a general microprocessor 3 which is used to command and process the measurements from the interface IC 2. Both the interface IC 2 and the general microprocessor 3 have connection to the heater for appropriate control thereof via low side drive 10, via line 11b from the general microprocessor 3 and line 11a between line 11b and the interface IC 2.

In the figure, generally components of the impedance "Z" measurement circuitry 100 and components thereof in the interface IC 2 are shown and described hereinafter. Z measurement is the measurement of cell impedance to determine sensor temperature. The interface IC 2 ("Z" measurement circuitry 100) has an amplifier 12 receiving an input from electrode 8a, thereafter the output of the amplifier is passed through a track and hold (T/H) block 13 before being fed to a A/D converter 14. The outputs from this, representative of cell impedance, are then read from the interface IC 2 by the general microprocessor 3. Functional control block 15, adapted to receive a measurement command signal from the microprocessor, can control the track and hold 13 via line 50. It can also control a transistor MOSFET switch 16 to ground the voltages from electrodes 8b and 8c and the current source 23 that is connected to electrode 8a.

It should be noted that all or some of the functionality of interface IC 2 may be incorporated into the microprocessor 3.

The microprocessor includes heater control functionality shown by dotted box 18 which includes means 19 to determine from the input 19a from the A/D converter 14 a "Z" calculation which is then filtered by filter 20, the output of which is input to appropriate control block 21 which may comprise a proportional integral (PI) control to drive PWM voltage generator 22 which in turn is connected to the heater 9 via line 11b.

The general microprocessor 3 also has a block 28 where it is determined to send out a "Z" measurement command via line 17 to the interface IC 2 which is input to the functional control block 15. This instructs the interface IC 2 to begin making an impedance measurement.

Figure 2:
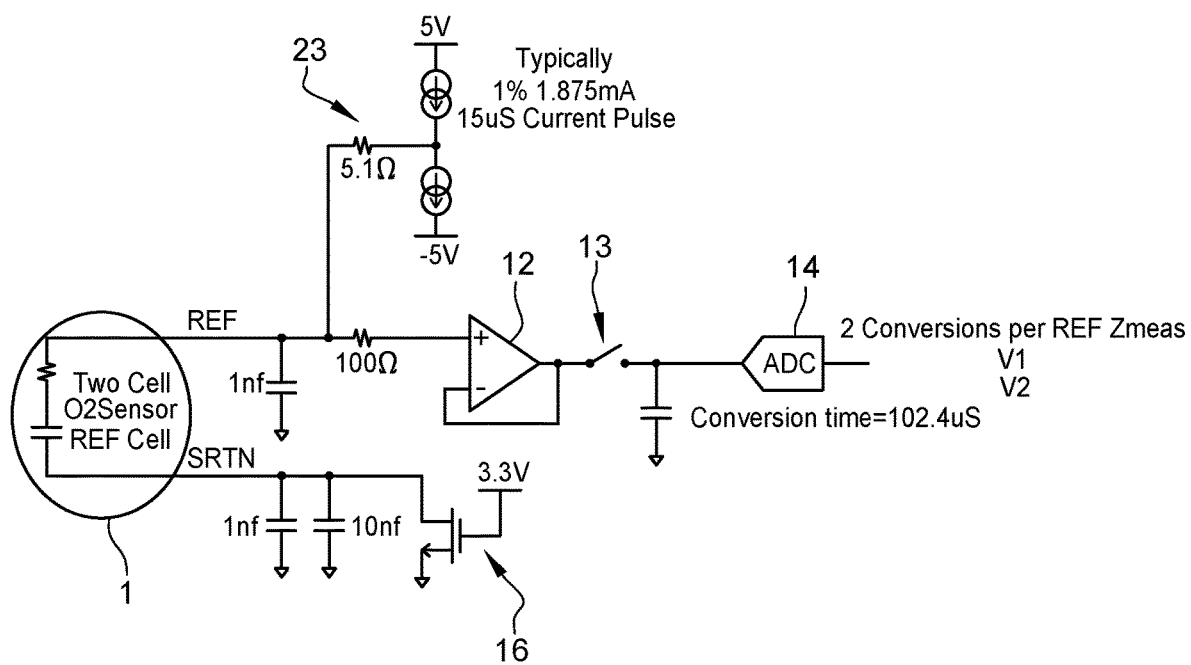
FIG. 2 shows an alternative simplified schematic circuit diagram.
Figure 4:
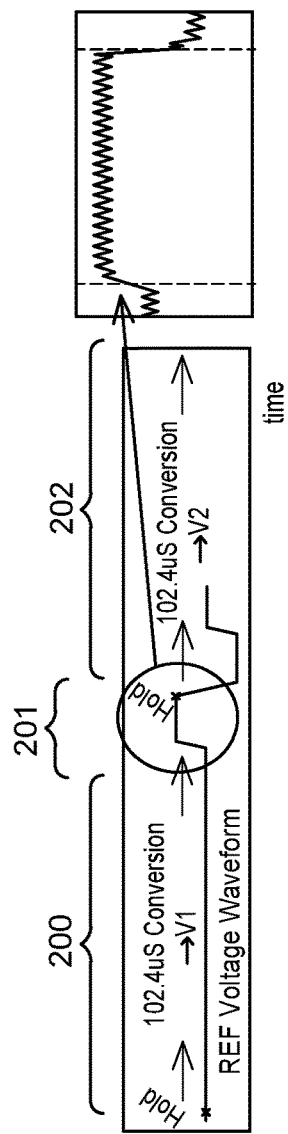
FIG. 4 shows a schematic impedance measurement voltage waveform in portion a) and portion b) shows a scope trace of an impedance measurement waveform portion circled in portion a) in detail.

FIG. 2 shows an alternative simplified schematic circuit diagram of the 2-cell O2 sensor 1 and interface IC components illustrating the sensor interface IC impedance measurement circuitry. Like reference numerals indicate the same components as FIG. 1. Section a) of FIG. 4 is a graph showing the reference cell voltage verses time during the impedance measurement sequence.

An impedance measurement sequence is controlled by the functional control block 15 and begins when instructed by the microprocessor 3 via line 17. The function control block 15 commands the track and hold block 13 to hold and an A/D converter 14 conversion is completed (FIG. 4 200). The functional control block 15 then commands track and hold block 13 to track and then activates current source 23 which sources current into the reference cell and through MOSFET switch 16 to ground (FIG. 4 201). A period of time after the initiation of the current pulse e.g. 15 μs, the track and hold is again commanded to hold (FIG. 4 202). The current source 23 is then turned off and a second A/D converter 14 conversion is made. The general microprocessor 3 reads the two A/D conversions and calculates the impedance based upon the known current pulse magnitude.

Invention

In order to eliminate the possibility of a consistent offset in temperature (impedance) measurement as described above, according to a examples a e.g. pseudo random time duration is inserted i.e. provided between the time when the microprocessor impedance measurement command was received/generated and when the actual measurement is performed e.g., by the sensor interface IC. This random delay eliminates the possibility of the injected noise being synchronous with the periodic rate of impedance measurement. While perturbation of the impedance measurement can still exist, the consistent offset cannot. The thermal time constant of the ceramic heater/O2 sensor cell along with the control loop compensation can filter out the random perturbations.

Figure 3:
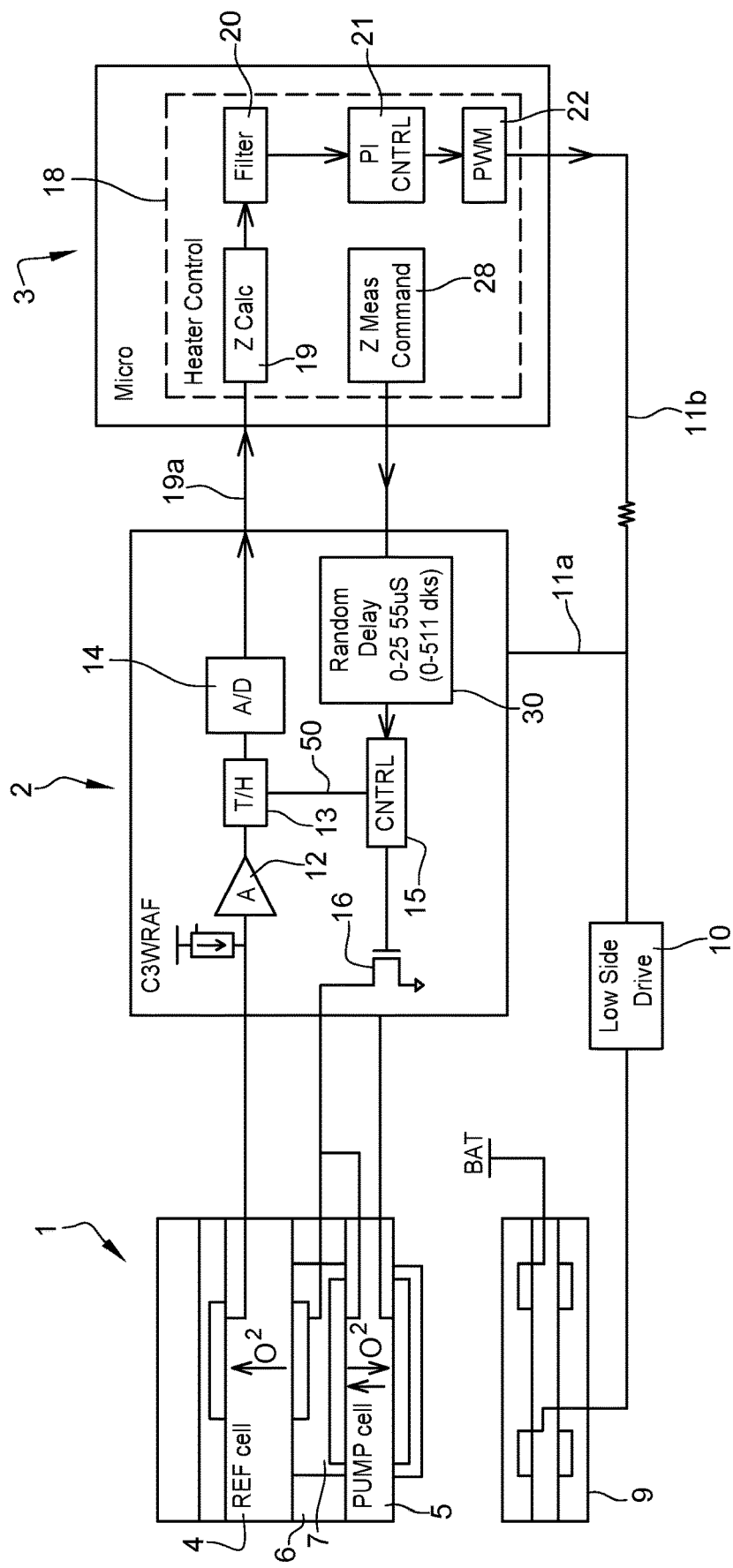
FIG. 3 shows a system according to one example.

FIG. 3 shows a system according to one example which is similar to FIG. 1 which shows the sensor, sensor interface IC and the microprocessor and the sub-blocks associated with impedance measurements as before with like reference numerals denoting the same components. However, also included is the random delay addition comprising of a delay block 30 which introduces a random delay to the output measurement command signal from the general microprocessor 3 received by controller block 15 of the interface IC 2. The circuitry and method according to examples is configured to provide a delay in the measurement of the sensor REF cell impedance from when the measurement command is sent, so that the impedance measurement quantity provided along line 19a is the impedance measured at a time subsequent to the measurement command plus a random delay. In one example the functional control block 15 controls the track and hold block 13 via line 50 to provide the delay. Such a system and methodology, means the possibility of a consistent offset can be eliminated.

FIG. 4 shows the reference cell voltage waveform verses time during the impedance measurement sequence. In section b, FIG. 4 shows an actual scope trace of the reference cell voltage during the impedance measurement waveform portion circled in section a) of FIG. 4 in detail, with Bulk Current Injection (BCI) injected into the sensor harness. The periods 200 and 202 show the time periods where the reference cell voltage measurements are being converted e.g. analog to digital conversion is taking place, and 201 shows the delay.

As shown in the figures e.g. FIGS. 2 and 4, for a two cell sensor, the impedance measurement is made by sampling and measuring the reference cell voltage, then injecting a precision current into the reference cell and sampling and measuring the reference cell voltage again while this current is being injected. The difference between the two voltage measurements divided by injected current provides an impedance value.

When noise, such as bulk current injection, is added onto the sensor harness, perturbations in the sampled voltages can occur causing errors in the impedance readings. If the frequency of this noise is an integer multiple of the rate at which measurements commands are issued, this perturbation can be such that it causes a consistent offset in the reading.

Figure 5:
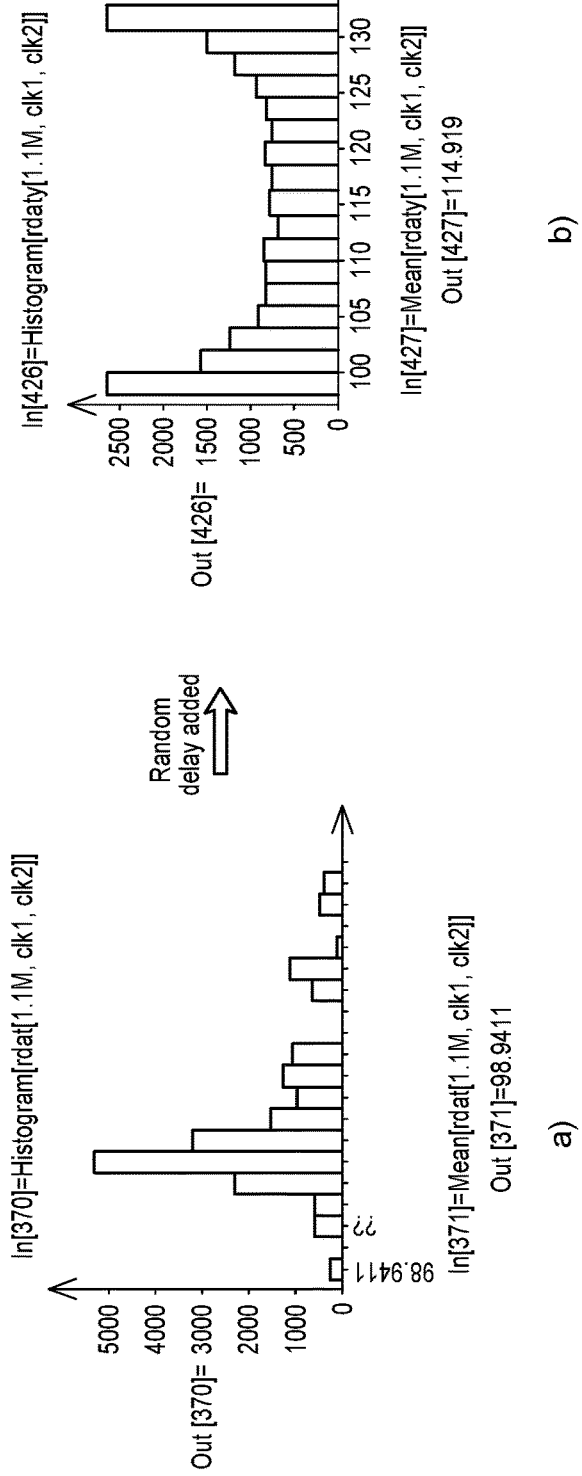
FIG. 5 shows distribution of impedance measurements with and without examples of the invention.

By adding a random delay between when the measurement command is given by the microprocessor, and when the measurement is performed, as shown in as shown in FIG. 4, the possibility of a consistent offset can be eliminated as shown in FIG. 5.

In FIG. 5, a distribution of impedance measurements without the random delay added is shown on the left. This distribution has a mean of 99Ω when the actual impedance is 115Ω. The distribution on the right in FIG. 5 shows the distribution after the random delay is added and has a mean of 115Ω.

Since the mean of this distribution is correct and the time constant of cell temperature with respect to battery PWM is on the order of seconds, the variation in these measurements occurring at rates on the order of 25 mS effectively gets filtered out by the sensor. Section a) of FIG. 5 shows a distribution of calculated impedance measurements which displays an offset from the actual 115 Ohm value due to synchronized injected noise. Also shown in section b) FIG. 5 is the distribution resulting from the introduction of the random delay associated with the invention and whose mean is very close to the actual value of 115 Ohms.

We claim:

1. An oxygen sensor system including an oxygen sensor and associated circuitry connected thereto, said an oxygen sensor including a reference cell, said associated circuitry configured to measure the impedance of said reference cell at time intervals, wherein said time intervals include a random component.

2. An oxygen sensor system as claimed in claim 1 wherein said associated circuitry includes a connection to said reference cell, and is configured to determine the temperature of said oxygen sensor based on the measurement of impedance of said reference cell at said time intervals, and control a sensor heater dependent on said determined temperature.

3. An oxygen sensor system as claimed in claim 2 wherein said associated circuitry comprises means configured to receive a signal dependent on the voltage of said reference cell, process said signal, determine an PWM signal therefrom, and output aid PWM signal to control said sensor heater.

4. An oxygen sensor system as claimed in claim 3 wherein said associated circuitry further comprises a processor and intermediate circuitry connected between said oxygen sensor and said processor.

5. An oxygen sensor system as claimed in claim 4 where said intermediate circuitry includes a connection from said reference cell, and is configured to output a voltage to said processor based on the impedance of said reference cell.

6. An oxygen sensor system as claimed in claim 5, wherein said processor is configured to send temperature/impedance measurement commands to said intermediate circuitry, and said intermediate circuitry is configured to send a signal to said processor consequent to receiving said measurement command from said processor.

7. An oxygen sensor system as claimed in claim 6 including random time delay generating means configured to determine a random time delay, and where said intermediate circuitry is configured to output a voltage signal to said processor, said voltage signal being indicative of the reference cell impedance at a time point, said time point being the time point of reception of the measurement command plus said random time delay.

8. An oxygen sensor system as claimed in claim 7 wherein said intermediate circuitry includes said random time delay generating means, and further includes a switch configured to control the output voltage indicative of the impedance of said reference cell to said processor, dependent on the random time delay.

9. An oxygen sensor system as claimed in claim 1 wherein said associated circuitry comprises means configured to receive a signal dependent on the voltage of said reference cell, process said signal, determine an PWM signal therefrom, and output aid PWM signal to control said sensor heater.

10. An oxygen sensor system as claimed in claim 9 wherein said associated circuitry further comprises a processor and intermediate circuitry connected between said oxygen sensor and said processor.

11. An oxygen sensor system as claimed in claim 10 where said intermediate circuitry includes a connection from said reference cell, and is configured to output a voltage to said processor based on the impedance of said reference cell.

12. An oxygen sensor system as claimed in claim 11, wherein said processor is configured to send temperature/impedance measurement commands to said intermediate circuitry, and said intermediate circuitry is configured to send a signal to said processor consequent to receiving said measurement command from said processor.

13. An oxygen sensor system as claimed in claim 12 including random time delay generating means configured to determine a random time delay, and where said intermediate circuitry is configured to output a voltage signal to said processor, said voltage signal being indicative of the reference cell impedance at a time point, said time point being the time point of reception of the measurement command plus said random time delay.

14. An oxygen sensor system as claimed in claim 13 wherein said intermediate circuitry includes said random time delay generating means, and further includes a switch configured to control the output voltage indicative of the impedance of said reference cell to said processor, dependent on the random time delay.

15. An oxygen sensor system as claimed in claim 1, wherein said processor is configured to send temperature/impedance measurement commands to said intermediate circuitry, and said intermediate circuitry is configured to send a signal to said processor consequent to receiving said measurement command from said processor.

16. An oxygen sensor system as claimed in claim 15 including random time delay generating means configured to determine a random time delay, and where said intermediate circuitry is configured to output a voltage signal to said processor, said voltage signal being indicative of the reference cell impedance at a time point, said time point being the time point of reception of the measurement command plus said random time delay.

17. An oxygen sensor system as claimed in claim 16 wherein said intermediate circuitry includes said random time delay generating means, and further includes a switch configured to control the output voltage indicative of the impedance of said reference cell to said processor, dependent on the random time delay.

18. A method of controlling the temperature of an oxygen sensor, said oxygen sensor including a reference cell and a heater, said method comprising
   a) measuring the impedance of said reference cell at time intervals;
   b) determining the temperature of said sensor based on the measurement of impedance of said reference cell at said time intervals;
   c) controlling said heater dependent on said determined temperature;
   wherein said time intervals include a random component.

19. A method as claimed in claim 18 wherein said oxygen sensor is part of an oxygen sensor system which includes a processor and intermediate circuitry connected between said oxygen sensor and said processor, said intermediate circuit configured to provides a signal indicative of said impedance to said processor.

20. A method as claimed in claim 19 wherein step a) comprises
   i) sending out temperature measurement commands at regular intervals to said intermediate circuitry from said processor;
   ii) sending impedance measurements of said reference cell consequent to said temperature measurement commands to said processor from said intermediate circuitry; said impedance measurements being taken at a random delay time after corresponding temperature measurement commands.

* * * * *